Jan. 12, 1943.  C. W. GREEN  2,308,281
STALK CUTTER
Filed Nov. 7, 1941  2 Sheets-Sheet 1
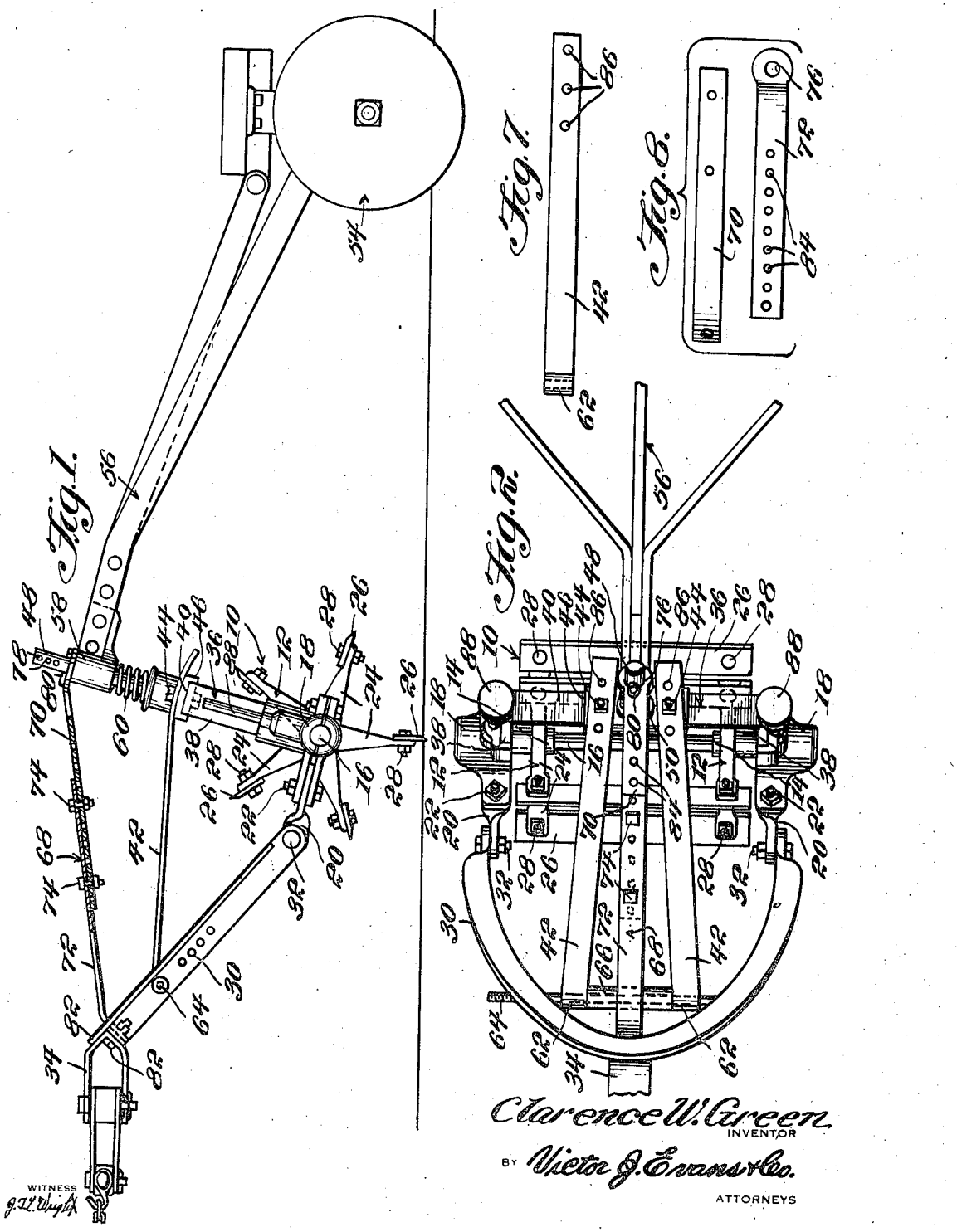
Clarence W. Green
INVENTOR
BY Victor J. Evans & Co.
ATTORNEYS Jan. 12, 1943. C. W. GREEN 2,308,281
STALK CUTTER
Filed Nov. 7, 1941 2 Sheets-Sheet 2
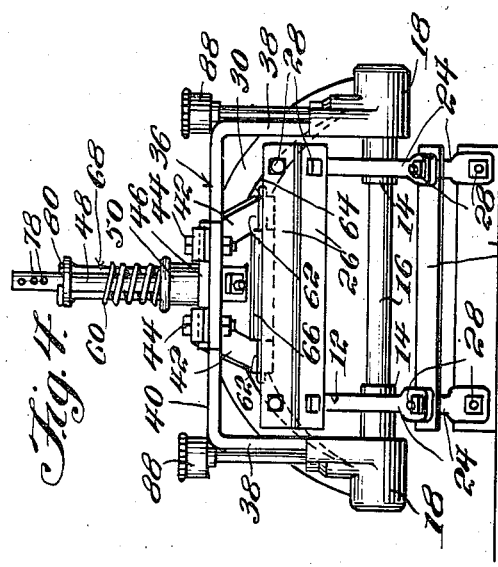
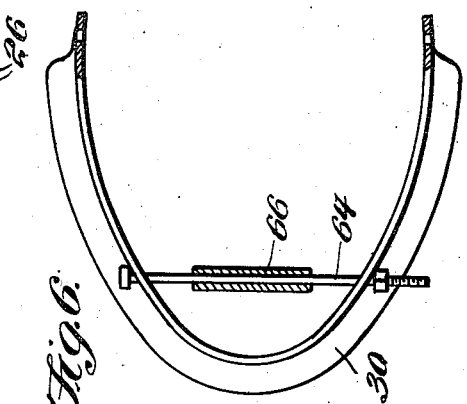
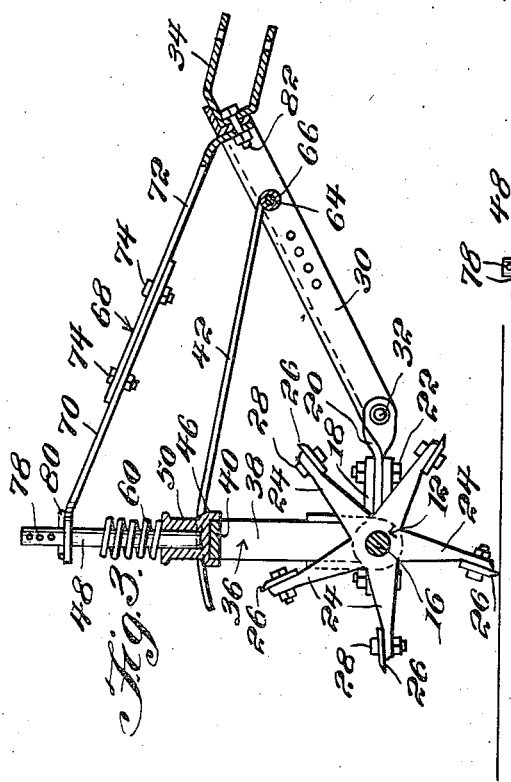
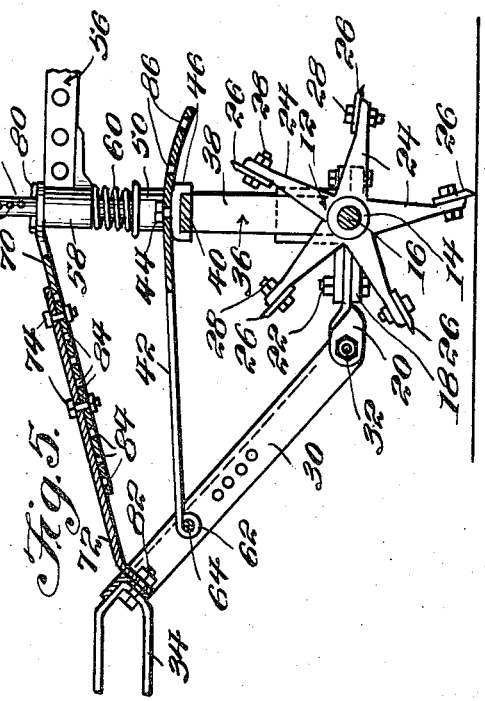
Clarence W. Green
INVENTOR
BY Victor J. Evans & Co.
ATTORNEYS Patented Jan. 12, 1943

2,308,281

UNITED STATES PATENT OFFICE 2,308,281

STALK CUTTER

Clarence W. Green, Caraway, Ark., assignor of one-third to James E. Parr and one-third to Hollis H. Arnold, both of Caraway, Ark.

Application November 7, 1941, Serial No. 418,251

4 Claims. (Cl. 55—61)

My invention relates to agricultural implements, and includes among its objects and advantages the provision of an improved stalk cutter which may be used in conjunction with a disk harrow for cutting the stalks in such lengths as to enable the disk harrow to turn under the severed stalks.

In the accompanying drawings:

Figure 1 is a side elevational view of a stalk cutter in accordance with my invention, illustrating the disk harrow connected with the stalk cutter and the latter located in advance of the disk harrow for connection with a source of power, such as a team of horses;

Figure 2 is a top plan view of the structure of Figure 1;

Figure 3 is a fragmentary elevational view of the stalk cutter;

Figure 4 is a rear elevational view;

Figure 5 is a view similar to Figure 3 showing the stalk cutter adjusted to a higher position for connection with the source of power;

Figure 6 is a view of the main frame of the stalk cutter, with certain parts in section;

Figure 7 is a plan view of one of the structural members of the stalk cutter; and Figure 8 is a view of another frame member, this frame member comprising two sections separated in Figure 8 for the purpose of illustration.

In the embodiment selected to illustrate my invention, the stalk cutter 10 comprises two spiders 12 having hubs 14 secured to an axle 16. This axle is rotatably journaled in bearings 18 each having a short bar 20 attached thereto by a bolt 22. To the outer ends of the spider arms 24 are secured stalk cutting blades 26, as by bolts 28. These blades parallel the axis of the axle 16 and are located at equal distances therefrom so as to roll in the nature of a cylinder when the stalk cutter is pulled across the field.

A generally U-shaped frame 30 has its ends pivotally connected with the bars 20 by bolts 32. To the bight of the frame 30 is connected a clevis 34 which, in the case of horse power, serves as a connection for the doubletree. A second U-shaped frame 36 has its legs 38 fixedly secured to the bearings 18 and is normally positioned in a substantially upright manner. To the bight 40 is connected two brace members 42 by bolts 44, the latter passing through a channel-like member 46 clamped on the bight 40 through tightening of the bolts 44.

One end of a shaft 48 is secured in a socket 50 cast integrally with the member 46. Figure 1 illustrates the disk harrow generally at 54, which disk harrow includes the draw bar means 56 having an eye 58 in which the shaft 48 is receivable. Between the eye 58 and the socket 50 is interposed a spring 60 which serves as a cushion to absorb vibrations and jolts transmitted from the disk harrow to the stalk cutter.

The opposite ends of the brace members 42 are provided with eyes 62 through which a long bolt 64 is passed and secured to the side runs of the frame 30. A tube 66 is mounted on the bolt 64 as a spacer for the two brace members 42. In addition to the two brace members 42, an adjustable pull brace 68 is provided. The members 70 and 72 of this brace are adjustably connected together by bolts 74, and one end of the member 70 is provided with an opening 76, see Figure 2, for loosely receiving the shaft 48. The eye 58 of the disk harrow draw bar is positioned between the member 70 and the spring 60 so as to be held in place on the shaft 48. A series of transverse openings 78 is provided in the shaft 48 for selectively receiving a cotter pin 80, which holds the member 70 connected with the shaft. The member 72 is secured to the bight of the frame 30 opposite the clevis 34 by a bolt 82. The height of the clevis 34 may be varied to satisfy different working conditions, which adjustment is made by lengthening or shortening the pull brace 68. Figure 5 illustrates the member 70 as being provided with a plurality of closely spaced openings 84 for selectively receiving the bolts 74.

Both brace bars 42 are adjustably connected with the member 46 to allow for lengthening and shortening of the pull brace 68. Figures 2 and 5 illustrate the two brace bars as being provided with a number of openings 86 for selective reception of the bolts 44 to permit adjustment for length. Each of the bearings 18 is provided with a grease cup 88.

In addition to cushioning vibration, the spring 60 is placed under compression so that the weight of the disk harrow draw means 56 is transmitted to the stalk cutter for properly loading the stalk cutter to effectively sever the stalk.

The present invention comprises a relatively simple structure particularly adapted to horse power, wherein the implement serves as a draw means for the disk harrow. The stalks are cut in such lengths as to permit the disk harrow to effectively turn the pieces under. However, the stalk cutter may be hitched to a suitable engine powered machine in lieu of horse power.

Without further elaboration, the foregoing will so fully illustrate my invention, that others may, by applying current knowledge, readily adapt the same for use under various conditions of service.

I claim:

1. The combination of a farm implement draw means, a stalk cutter comprising a first frame having a mount for connection with said draw means, bearings on said frame, an axle journaled in said bearings, stalk cutting blades fixedly connected with said axle, a draw frame connected with said bearings, a tie member connected with said draw frame and said mount, a brace means connecting said first frame with said draw frame, and a cushioning spring interposed between said draw means and said first frame.

2. The combination of a farm implement draw beam, a stalk cutter comprising a first frame having a mount for connection with said draw beam, bearings on said frame, an axle journaled in said bearings, stalk cutting blades fixedly connected with said axle, a draw frame pivotally connected with said bearings, a tie member connected with said draw frame and said mount, said draw frame being arranged at an angle to said first frame and having a connection for a source of power at its highest point, and means for adjusting the length of said tie member to vary the angularity between said first frame and said draw frame for respectively raising or lowering said connection.

3. The combination of a farm implement draw means, a stalk cutter comprising a first frame having a mount for connection with said draw means, bearings on said frame, an axle journaled in said bearings, stalk cutting blades fixedly connected with said axle, a draw frame connected with said bearings, a tie member connected with said draw frame and said mount, said mount comprising a shaft and said draw means having an eye loosely encircling the shaft, a spring mounted on said shaft between said first frame and said eye, and said tie member embracing said shaft and holding the eye thereon and maintaining said spring under compression.

4. A stalk cutter comprising an inverted U-shaped frame having a bearing at the end of each leg thereof, an axle journaled in said bearings, stalk cutting blades fixedly related to said axle, a draw frame of generally U-shaped configuration having its ends pivotally connected with said bearings, an upstanding shaft fixedly connected with said first-mentioned frame for connection with a farm implement, a tie member connecting said shaft with said draw frame, a rod extending crosswise of said draw frame, brace members connected with said rod and said first-mentioned frame, and a spacer on said rod between said brace members, said brace members being adjustably connected with said first-mentioned frame and said tie member having an adjustment therein for fixedly securing the draw frame in different angular positions with respect to said first-mentioned frame.

CLARENCE W. GREEN.